United States Patent [19]

Plunkett et al.

[11] Patent Number: 4,473,790

[45] Date of Patent: Sep. 25, 1984

[54] CONTROL CIRCUIT FOR SUPPRESSION OF LINE RESONANCES IN CURRENT FEEDBACK PULSE WIDTH MODULATION CONTROL SYSTEMS WITH A MINIMUM D-C FILTER

[75] Inventors: Allan B. Plunkett, Scotia; John D. D'Atre, Ballston Lake, both of N.Y.; Allen M. Ritter, Rocky Mount; Luis J. Garces, Charlottesville, both of Va.

[73] Assignee: General Electric Company, Schenectady, N.Y.

[21] Appl. No.: 455,073

[22] Filed: Jan. 3, 1983

[51] Int. Cl.³ .................................................. H01P 5/40
[52] U.S. Cl. ..................................... 318/798; 318/806; 318/811
[58] Field of Search ............... 318/798, 806, 702, 701, 318/811

[56] References Cited

U.S. PATENT DOCUMENTS

| | | | |
|---|---|---|---|
| 3,546,551 | 12/1970 | Risberg et al. | 318/805 |
| 3,753,063 | 8/1973 | Graf | 318/806 |
| 3,800,199 | 3/1974 | Weigand | 318/701 |
| 3,813,589 | 5/1974 | Boice | 318/702 |
| 3,935,518 | 1/1976 | Yatsuk et al. | 318/805 |
| 4,186,334 | 1/1980 | Hirata | 318/811 |
| 4,258,302 | 3/1981 | Plunkett | 318/723 |
| 4,320,331 | 3/1982 | Plunkett | 318/722 |

OTHER PUBLICATIONS

J. Zubek et al., "Pulse Width Modulated Motor Drives with Improved Modulation," 9th Annual IEEE/IAS Mtg. 1974, vol. 1A-11, No. 6, Nov./Dec. 1975, pp. 695-703.

Walden & Turnbull, "Adjustable Voltage and Frequency Polyphase Sine Wave Generator", 1974 IEEE/IAS Annual Mtg., (74 CHO 833-41A), pp. 1015-1020.

Primary Examiner—David Smith, Jr.
Attorney, Agent, or Firm—Mark L. Mollon; James C. Davis, Jr.; Marvin Snyder

[57] ABSTRACT

A variable speed a-c drive motor is controlled by a current feedback pulse width modulation scheme which effectively isolates the controlled motor current from variations in the input d-c voltage. An additional control loop is provided to superimpose a control signal on the amplitude command input circuit of the pulse width modulation control scheme. The additional loop responds to line current and particularly line current resonance between the input d-c filter and the line inductance. Instantaneous line current is then maintained at the minimum required to support instantaneous power flow to the a-c motor so that resonance current is suppressed.

10 Claims, 12 Drawing Figures

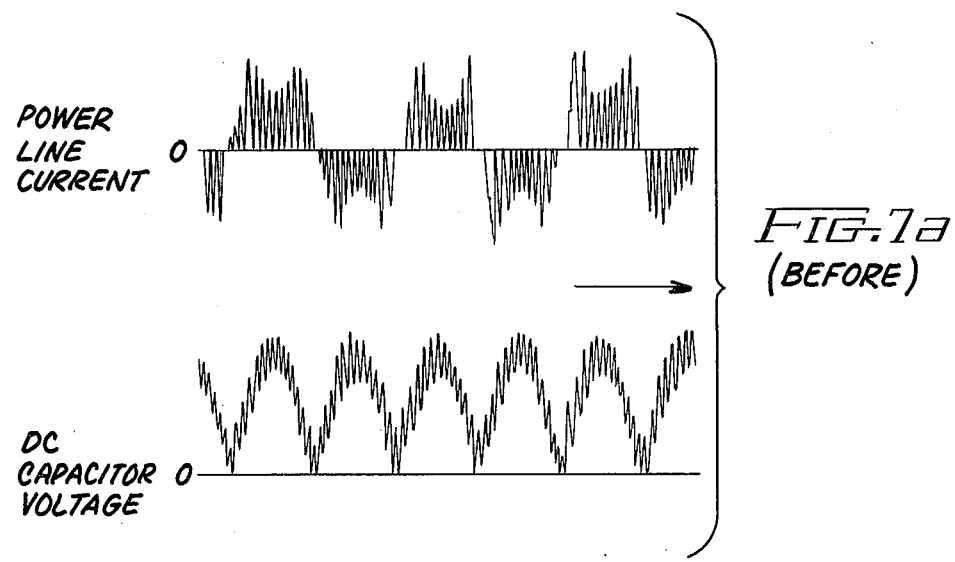
FIG. 7a (BEFORE)
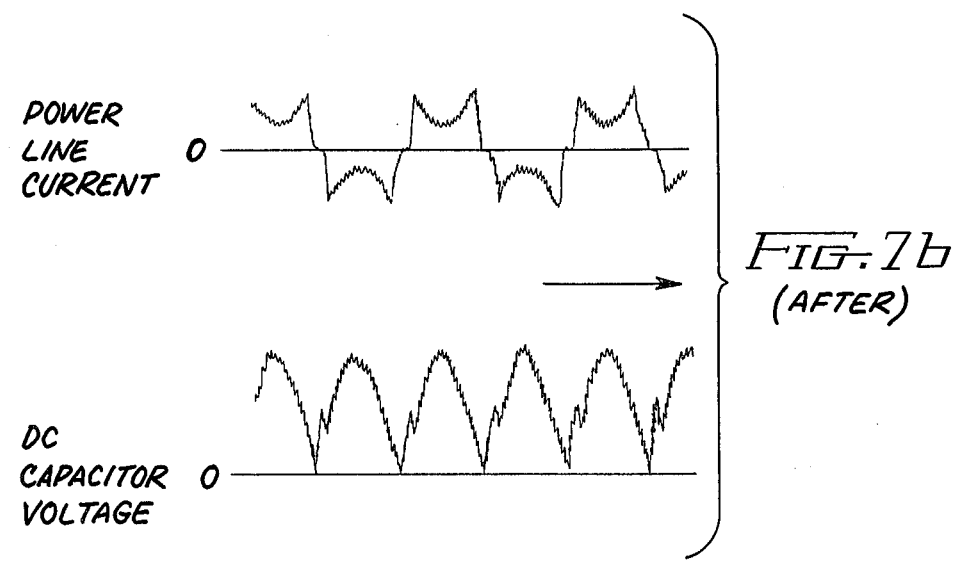
FIG. 7b (AFTER)

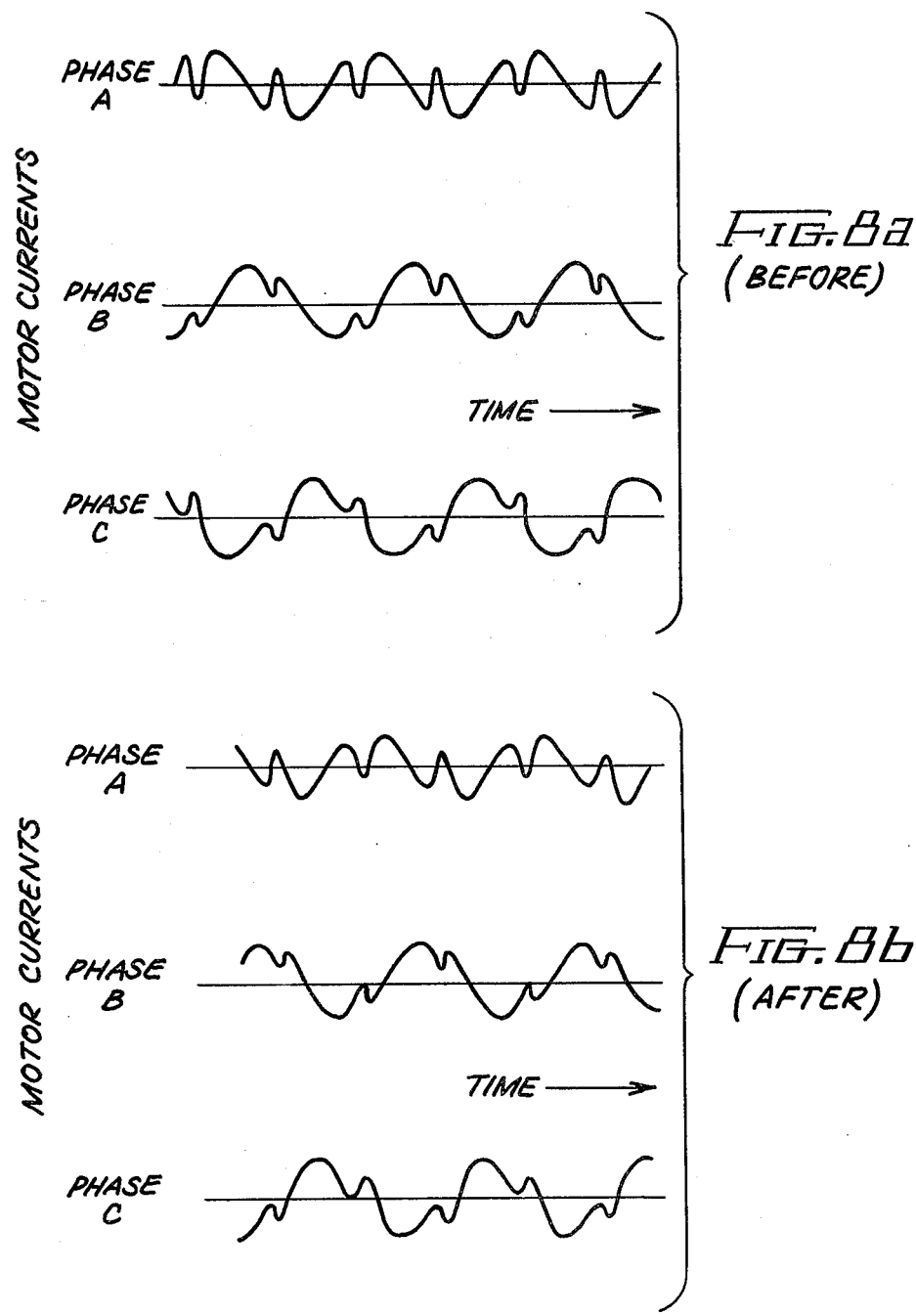

CONTROL CIRCUIT FOR SUPPRESSION OF LINE RESONANCES IN CURRENT FEEDBACK PULSE WIDTH MODULATION CONTROL SYSTEMS WITH A MINIMUM D-C FILTER

BACKGROUND OF THE INVENTION

This invention relates to alternating current machine drive systems employing current feedback pulse width modulation control and more specifically relates to a novel control link for such systems which suppresses resonance current in the line and between the line inductance and the d-c filter capacitance.

Alternating current machine applications which require regulation of machine speed and torque are well known. Such applications frequently employ inverter machine drive systems for their control. A typical control system of this kind is disclosed in U.S. Pat. No. 4,320,331, issued Mar. 16, 1982, entitled "TRANSISTORIZED CURRENT CONTROLLED PULSE WIDTH MODULATED INVERTER MACHINE DRIVE SYSTEM" in the name of Allan B. Plunkett and assigned to General Electric Company. The control system of the above patent employs a circuit consisting of pairs of transistors coupled in series-aiding fashion. Each of the pairs of serially coupled transistors is connected across a d-c filter capacitor which is in turn connected across the d-c terminals of a suitable rectifier. The rectifier input is connected to a suitable a-c power source. Electromagnetic interference filters may also be provided in the a-c input circuit. The transistors of each inverter transistor pair are alternately conductive to supply alternating current at the inverter output in accordance with a current error signal which is proportional to the difference in magnitude between the actual inverter phase current and a sinusoidal reference signal. The conduction state of the transistors of each pair reverses each time the current error signal exceeds an upper and lower hysteresis limit, which limits vary in accordance with actual inverter phase current. The inverter output voltage which controls machine speed and torque is then controlled by varying the sinusoidal reference signal frequency and amplitude, respectively, in accordance with operator commands. Optimum inverter machine drive performance is achieved by regulating this sinusoidal reference signal amplitude and frequency in accordance with a feedback machine torque signal and a feedback machine flux signal, respectively.

This type system effectively isolates the machine current from variations in the d-c filter voltage. However, it is still possible for the line inductance, including the inductance of the electromagnetic interference filter, and the d-c capacitor to resonate. Thus, the input a-c power line current may experience very wide oscillation which makes the control system unusable in many applications. The line current resonance also causes additional stress on the system components due to the voltages which are produced by the resonating current.

In the past, this line resonance was reduced by increasing the size of the d-c filter so that line current would be better smoothed. This, however, requires a substantially larger d-c filter capacitor than would otherwise be needed and also requires the use of a relatively large d-c smoothing reactor.

It is an obejct of the present invention to provide a control circuit for suppressing line resonance current in a current feedback pulse width modulation system while allowing minumum d-c filter operation.

It is a further object of the present invention to provide a control circuit for suppressing line resonance currents to improve the line power flow by maintaining the instantaneous line current at the minium required to support the instantaneous power flow.

BRIEF SUMMARY OF THE INVENTION

In accordance with the present invention, an additional control loop is connected to the pulse width modulation system and operates to suppress the unwanted resonance current in the power line. The additional control loop is coupled to the amplitude control circuit of the pulse width modulation system and responds to the magnitude of the power line current as measured either in the a-c power line, or at the rectifier d-c power output current. The line current signal is then appropriately filtered and is applied to the pulse width modulation control system to force the pulse width modulated machine current to respond to the resonance current in such a manner as to suppress oscillation in the line current. The resulting a-c power line current will then exhibit only the instantaneous line current required to deliver power to the load with a superimposed chopping frequency current due to the pulse width modulation action of the inverter.

By connecting the additional control loop to respond to d-c filter capacitor current, the resonance current which occurs during the period that reflected motor voltages are higher than the related line voltages would also be reduced, although filtering requirements for the capacitor current become more critical.

BRIEF DESCRIPTION OF THE DRAWINGS

FIG. 3a shows the timing of the switching signals which are generated by the control apparatus of FIG. 2.

FIG. 3b is drawn on the same time base as FIG. 3a and shows the actual inverter current wave shape which is produced when the machine drive system of FIG. 1 is controlled by the control circuit of FIG. 2.

FIG. 7a shows the power line current and d-c capacitor voltage in the prior art circuit of FIG. 1, plotted on a common time scale.

FIG. 7b shows the power line current and d-c capacitor voltage similar to those of FIG. 7a when using the improved circuit of FIG. 4a.

FIG. 8a shows the motor currents in each of the three phases of the driven a-c machine when employing the circuit of FIGS. 1 and 2.

FIG. 8b shows the motor currents of FIG. 7a when employing the additional control loop as shown in FIG. 4a.

DETAILED DESCRIPTION OF THE PREFERRED EMBODIMENT

Before describing the preferred embodiments of the invention which are schematically shown in FIGS. 4a and 4b, 5 and 6, there is first described the prior art transistorized current controlled pulse width modulated inverter machine drive system as disclosed in above-noted U.S. Pat. No. 4,320,331 which is hereby incorporated by reference. It will then be shown how the additional control loop of FIGS. 4 and 5 produce substantial improvement in power line current ripple and in the d-c capacitor voltage ripple without affecting the performance of the machine being controlled. The additional control loop, however, can be used in any current pwm machine control such as a forced oscillation pulse with modulation current control. In the embodiment of the present invention, the machine being controlled may be a variable speed a-c motor drive.

Figure 1:
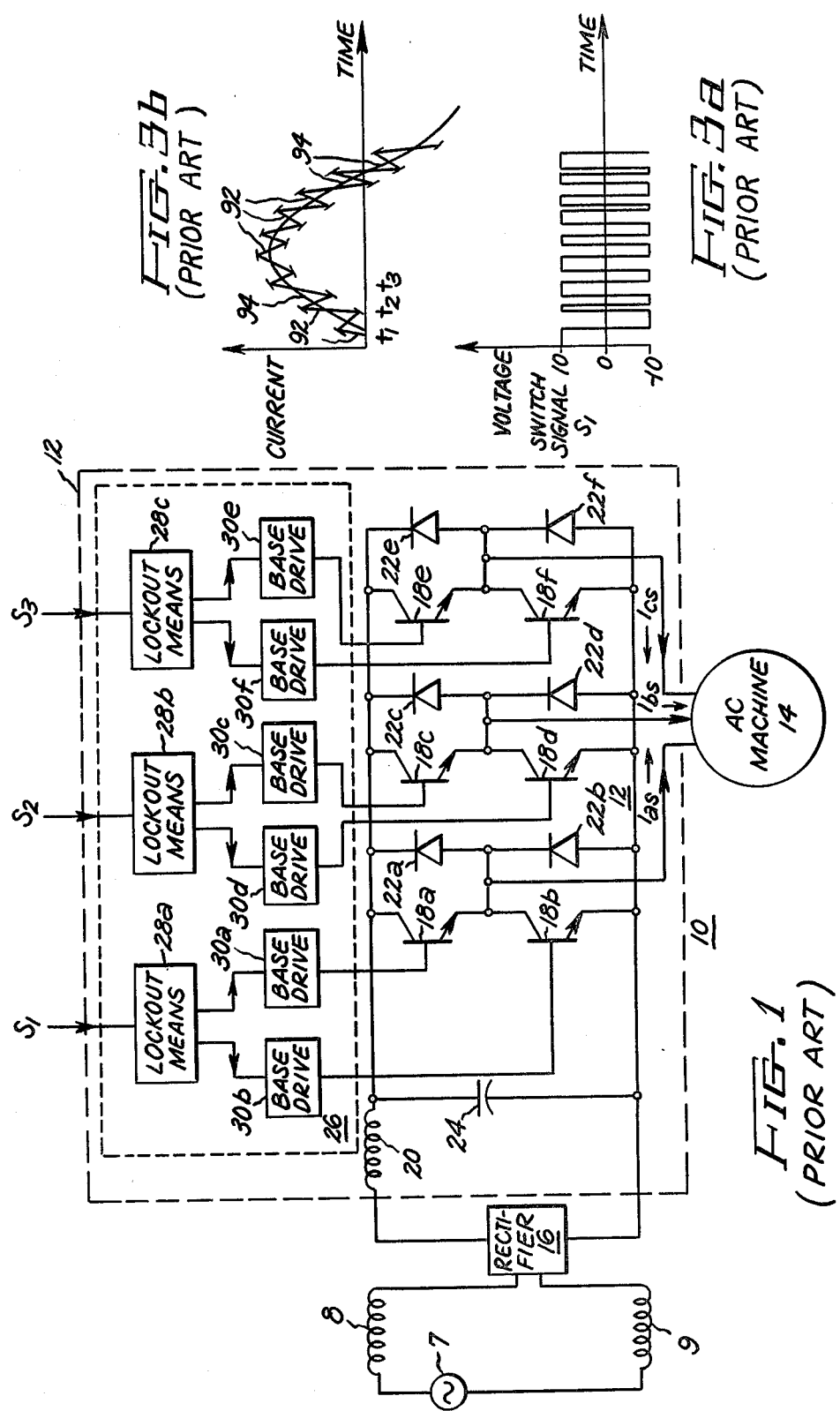
FIG. 1 is a schematic diagram of a prior art inverter alternating current machine drive system.

In FIG. 1 the machine drive system to be described is operated from any desired a-c power source 7 which has a power line inductance schematically shown by the inductors 8 and 9. A machine drive system 10 comprises an inverter 12 which supplies alternating current to an a-c machine 14, which may be either an induction or synchronous type machine, from a rectifier 16. Inverter 12 comprises three pairs of switching devices, shown as bipolar transistors 18a and 18b, 18c and 18d and 18e and 18f, respectively, with each of transistor pairs 18a and 18b, 18c and 18d and 18e and 18f coupled across direct current source 16. The junctions between transistors 18a and 18b, transistors 18c and 18d, and transistors 18e and 18f, respectively, are coupled to one of three phases of machine 14, respectively. Coupled in parallel opposition with the collector-emitter portion of each of transistors 18a–18f is one of diodes 22a–22f, respectively. Each of diodes 22a–22f provides a conductive path across an associated one of transistors 18a–18f, respectively. A filter capacitor 24 is coupled in series with inductor 20 and in parallel with transistor pairs 18a and 18b, 18c and 18d and 18e and 18f, respectively, and filters the voltage supplied by direct current source 16.

Each of the transistors of transistor pairs 18a and 18b, 18c and 18d, and 18e and 18f is rendered conductive by transistor firing logic means 26 in accordance with digital switching signals, S₁, S₂ and S₃, respectively, supplied to transistor firing logic means 26 by a control circuit (not shown). Transistor firing logic means 26 comprises three identically configured lock-out circuits 28a, 28b and 28c, respectively, which are all coupled to transistor base drive circuit pairs 30a and 30b, 30c and 30d and 30e and 30f, respectively. Each lock-out circuit, such as lock-out circuit 28a, for example, renders one of the base drive circuits of an associated pair of transistor base drive circuits, such as base drive circuit pair 30a and 30b, for example, operative in accordance with the digital switching signal supplied to the lock-out circuit. When rendered operative by the lock-out circuit, the base drive circuit supplies forward base drive current to an associated one of inverter transistors 18a–18f, respectively, to render the transistor conductive. Each of lock-out circuits 28a, 28b and 28c, respectively, is adjusted so that when one of the base drive circuits of each of transistor base drive circuit pairs 30a and 30b, 30c and 30d and 30e and 30f, respectively, is rendered operative, the remaining base drive circuit of each pair is prevented from becoming operative to render an associated inverter transistor conductive for a period of time, for example, 25 microseconds, following the instant the then-operative base drive circuit becomes inoperative. In this manner, simultaneous conduction of both of the transistors of each of inverter transistor pairs 28a and 18b, 18c and 18d and 18e and 18f is prevented.

During inverter 12 operation, machine 14 is supplied with alternating currents that are in three phase relationship with one another when the transistors of transistor pairs 18a and 18b, 18c and 18d and 18e and 18f are alternately rendered conductive in sequence by transistor firing logic means 26. By controlling the conduction duration of each transistor, inverter output voltage amplitude, and hence, a-c machine torque, can be regulated accordingly. By controlling transistor conduction frequency, inverter output frequency, and hence a-c machine speed can be adjusted accordingly. Control of inverter output voltage amplitude and frequency by regulation of the conduction duration and conduction frequency, respectively, of inverter switching devices is commonly referred to as "pulse width modulation".

Figure 2:
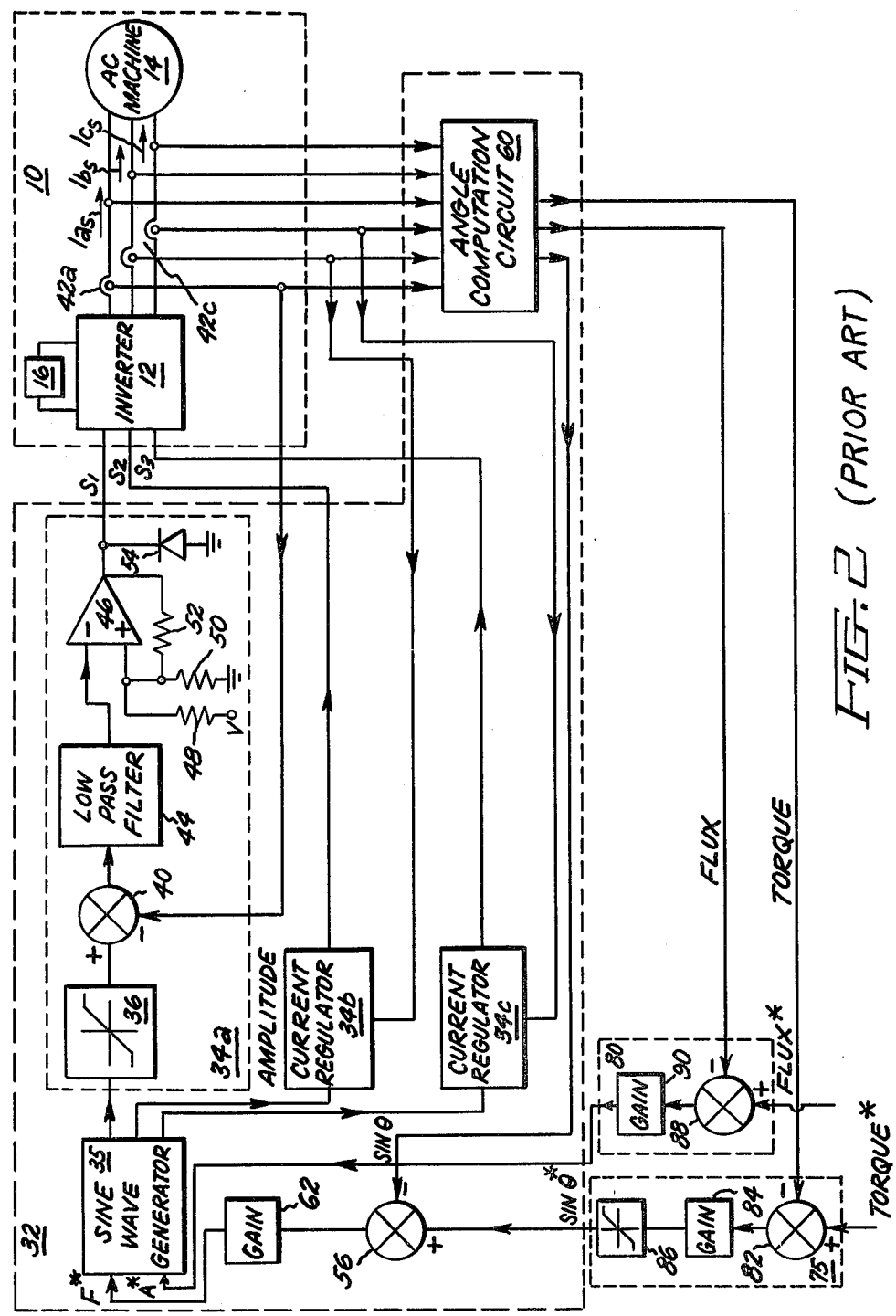
FIG. 2 is a schematic diagram of a prior art control circuit for controlling the inverter system of FIG. 1.

Inverter 12 of FIG. 1 is pulse width modulated in accordance with inverter current by a known control apparatus 32 shown in block form in FIG. 2. Control apparatus 32 comprises three identically configured current regulators: 34a, 34b and 34c, respectively, which all supply inverter 12 with inverter switching signals $S_1$, $S_2$ and $S_3$, respectively, in accordance with the difference in magnitude between a respective one of inverter phase current components $i_{as}$, $i_{bs}$ and $i_{cs}$, and a respective one of three sinusoidal reference signals supplied by a sine wave generator 35 in accordance with operator commands.

As each of current regulators 34a, 34b and 34c is configured of identical components and operates in a like manner, only the details of current regulator 34a are set forth. Current regulator 34a includes an amplitude limiter 36 which is supplied from sine wave generator 35 with one of three sinusoidal reference signals, each sinusoidal reference signal representing a respective phase component of desired inverter output current. Amplitude limiter 36, when supplied with a sinusoidal signal at its input, provides an amplitude-limited sinusoidal reference signal at its output to the non-invert input of a summing amplifier 40. Summing amplifier 40 is supplied at its invert input with the output signal of an associated one of current sensors 42a, 42b and 42c, respectively, which are all coupled in series with inverter 12 and a respective phase of machine 14, each current sensor providing an output signal which varies in accordance with an associated one of inverter phase current components $i_{as}$, $i_{bs}$ and $i_{cs}$, respectively. Summing amplifier 40 provides at its output a signal, proportional to the difference in magnitude between input signals supplied to the invert and non-invert summing amplifier inputs, to the input of a low pass filter 44.

A comparator 46 is coupled at the invert input to the output of low pass filter 44. The non-invert comparator input is coupled to circuit ground by a first resistance 50 and is coupled by a second resistance 48 to a voltage source (not shown) of amplitude (−V) where V is the magnitude of the d-c output voltage of rectifier 16 of FIG. 1. A third resistance 52 couples the output of comparator 46 to the non-invert comparator input so that a portion of the comparator output voltage is supplied to the non-invert comparator input. By supplying a portion of the comparator output voltage to the non-invert comparator input, the comparator output voltage, that is, switching signal $S_1$, becomes hysteresis limited. In practice, the ohmic values of resistances 48, 50 and 52 are chosen such that the hysteresis band about the comparator voltage, supplied to inverter 12, corresponds to a band of 5 to 10% of rated inverter output current about the desired inverter output current, thereby preventing switching of inverter transistors at a frequency in excess of the maximum transistor switching frequency. A diode 54 is coupled at the cathode to the output of comparator 46 and at the anode to circuit ground and clamps the comparator output voltage.

Sine wave generator 35 supplies each of current regulators 34a, 34b and 34c with one of three sinusoidal signals, each signal being in three phase relationship with one another. The amplitude and frequency of each of the three sinusoidal reference signals generated by sine wave generator 35 varies in accordance with an amplitude command signal A* and a frequency command signal F*, respectively, supplied to the amplitude input and frequency input, respectively, of the sine wave generator. In practice, the amplitude command signal A* varies in accordance with an operator-commanded inverter current amplitude. To avoid inverter instability at low frequencies as a consequence of regulating inverter switching device condition in accordance with inverter current, the inverter frequency command signal F* is varied in accordance with the difference in magnitude between an operator commanded machine phase angle relationship and the actual machine phase angle relationship. A summing amplifier 56 is supplied at the non-invert input with a signal sin $\theta^*$, proportional to the operator-commanded machine phase angle relationship magnitude. The invert summing amplifier input is supplied from an angle computation circuit 60, coupled to inverter 12 and to each of current sensors 42a, 42b and 42c, with a signal sin $\theta$ proportional to the actual machine phase angle relationship and which varies in accordance with inverter output voltage and current. In addition, angle computation circuit 60 also provides a pair of output signals, designated "Torque" and "Flux", in accordance with inverter output current and output voltage, which signals are all proportional to the actual machine torque and to the actual air gap flux magnitudes, respectively. The usefulness of these signals will become apparent hereinafter.

Typically, angle computation circuit 60 is configured similarly to the angle computation circuit described in my U.S. Pat. No. 4,258,302, entitled "Maintaining Synchronism of an Inverter Synchronous Machine Drive System at Light or Zero Machine Loads", assigned to General Electric Company and hereby incorporated by reference.

Summing amplifier 56 provides at its output, a signal, proportional to the difference in magnitude between input signals supplied to the invert and non-invert summing amplifier inputs, to the input of an amplifier 62. Amplifier 62 supplied sine wave generator 35 with frequency command signal F* in accordance with the output signal magnitude of summing amplifier 56.

Faster transient response and improved regulation of machine torque is provided by control apparatus 32 by the addition of first and second control loops 75 and 80, respectively, which all operate to supply sine wave generator 35 with machine phase angle command signal sin $\theta^*$ in accordance with machine torque, and to supply a current amplitude signal A in accordance with machine air gap flux, respectively. Control loop 75 comprises a summing amplifier 82 which is supplied at the non-invert input with a torque command signal Torque* proportional to an operator-commanded machine torque magnitude. The invert summing amplifier input is coupled to angle computation circuit 60 and is supplied therefrom with the Torque signal proportional to the actual machine torque magnitude. Summing amplifier 82 provides an output signal, proportional to the difference in magnitude between signals supplied to the invert and non-invert summing amplifier inputs, to the input of an amplifier 84. Amplifier 84 provides an output signal, proportional to the summing amplifier output signal, to the input of an amplitude limiter 86. Amplitude limiter 86 supplies the machine phase angle command signal sin $\theta^*$ to the non-invert input of summing amplifier 56 in accordance with the output signal magnitude of amplifier 84.

Control loop 80 includes a summing amplifier 88 which is supplied at the noninvert input with a flux command signal, Flux*, which varies in accordance with an operator commanded air gap flux magnitude. The invert input of summing amplifier 88 is coupled to angle computation circuit 60 and is supplied therefrom with the Flux signal proportional to the actual machine air gap flux magnitude. Summing amplifier 88 provides an output signal, proportional to the difference in magnitude between input signals supplied to the invert and non-invert summing amplifier inputs, to the input of an amplifier 90 which supplies sine wave generator 35 with current amplitude command signal A in accordance with the output signal magnitude of summing amplifier 88.

Operation of control apparatus 32 to supply inverter 12 of FIG. 1 with switching signals $S_1$, $S_2$ and $S_3$ will now be set forth with respect to FIGS. 3a and 3b. As each of current regulators 34b and 34c operates to supply inverter 12 wth a respective one of switching signals $S_2$ and $S_3$ in a manner identical to the operation of current regulator 34a, only the details of current regulator 34a operation are set forth.

Initially, it is assumed that the output voltage magnitude of comparator 46 of FIG. 2, and hence inverter switching signal $S_1$, is at a logical "1" level as indicated by the waveform of $S_1$ illustrated in FIG. 3a. With switching signal $S_1$ at a logical "1" level, transistor 18a of FIG. 1 is rendered conductive and inverter phase current $i_{as}$ increases linearly as evidenced by the waveform of $i_{as}$ which is represented by waveform 92 in FIG. 3b. When, at time $t_1$ the output signal magnitude of current sensor 42a, which varies in accordance with $i_{as}$, so exceeds the output signal magnitude of amplitude limiter 36, whose output signal waveform is represented by waveform 94 in FIG. 3b, such that the difference between the output signal magnitude of current sensor 42a and the output signal magnitude of amplitude limiter 36 exceeds the upper hysteresis limit of comparator 46, which limit is indicated by the dashed line segments above waveform 94, then the output signal magnitude of comparator 46, and hence, switching signal $S_1$, deviates from a logical "1" to a logical "−1" level. As a consequence, transistor 18a of FIG. 1 is rendered nonconductive. After a lockout period, typically of 25 microseconds beginning with the deviation of switching signal $S_1$, transistor 18b of FIG. 1 becomes conductive. The lockout period is used to insure that current flowing in the previously conducting transistor is stopped before the other transistor in the same leg becomes conductive. With transistor 18b conductive, $i_{as}$ decreases until time $t_2$ when the magnitude difference between output signals provided by current sensor 42a and amplitude limiter 36 exceeds the lower hysteresis limit of comparator 46, represented by the dashed line segment below waveform 94, at which time, the output signal magnitude of comparator 46, and hence $S_1$, changes from a logical "−1" level to a logical "1" level. After an interval of 25 microseconds following the change of switching signals $S_1$, transistor 18b of FIG. 1 again becomes conductive until time $t_3$ when the above sequence of events is repeated.

Operating as described above, control circuit 32 minimizes peak inverter currents by regulating transistor conduction in accordance with upper and lower hysteresis limits about the desired inverter phase current, as represented by a respective one of the sinusoidal reference signals generated by sine wave generator 35. By controlling the amplitude and frequency of each of the three sinusoidal output signals of sine wave generator 35 in accordance with a feedback air gap flux signal, and a feedback torque signal, respectively, objectionable jumps in inverter output current are virtually eliminated, thereby assuring smooth machine operation. In addition, by controlling the frequency of each of the sinusoidal reference signals in accordance with the difference between an operator-commanded machine phase angle relationship which varies in accordance with a feedback torque signal, and the actual machine phase angle relationship magnitude, machine stability is assured.

The Invention as Described in FIGS. 4a, 4b, 5 and 6

Figure 4A:
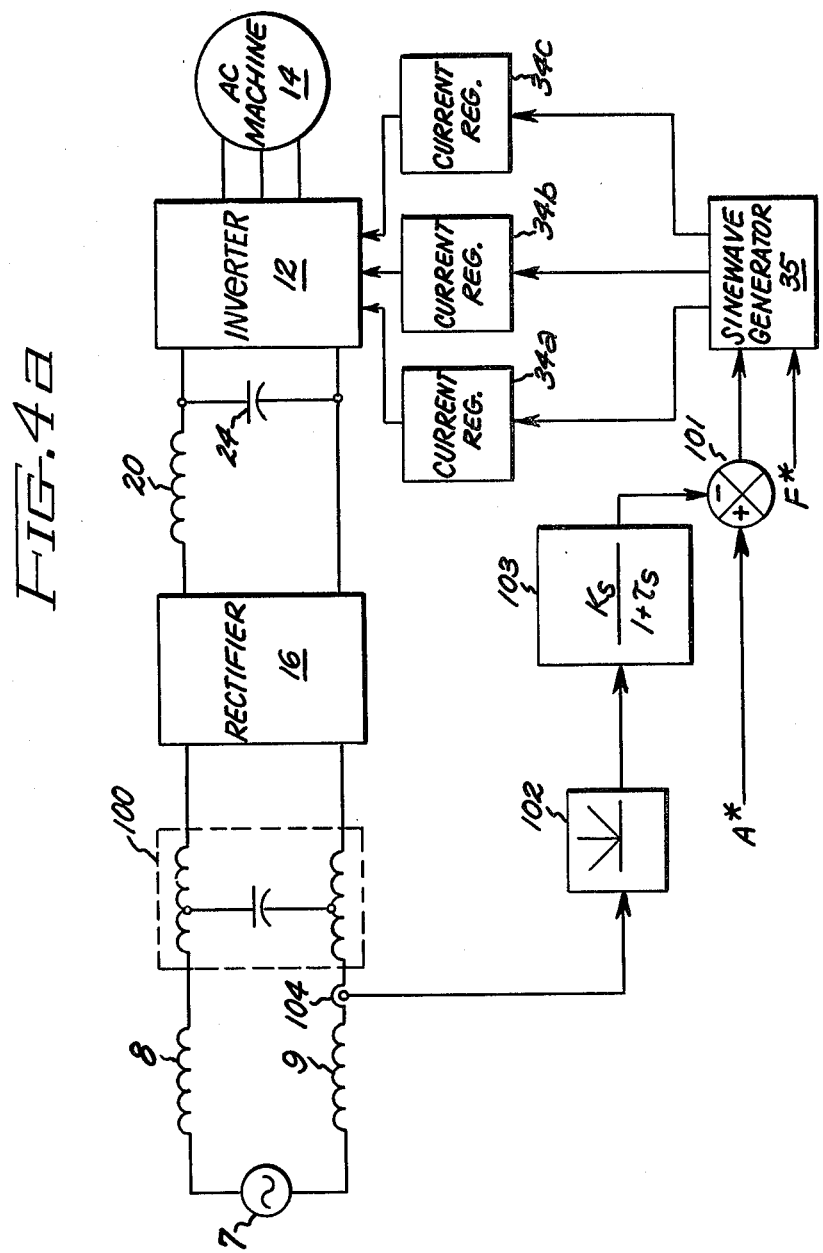
FIG. 4a is a schematic diagram of one embodiment of the control for a multi-phase input pulse width modulated inverter machine drive system such as that of FIG. 1 when modified with the novel additional control loop of the invention for suppression of power line current resonance.

FIG. 4a shows an embodiment of the additional control loop of the present invention which minimizes line current resonance between the d-c filter capacitor 24 of the system and the system inductance, including line inductances 8 and 9, the inductance 20 and the inductance contained in the electromagnetic interference filter 100 if such a filter is employed. A single phase a-c supply is shown in FIG. 4a.

The invention can be applied generally to inverter drive circuits but, in the illustrative embodiments, will be employed with the drive system of FIGS. 1 and 2. Thus, the prior art circuit of FIG. 2 is modified, in accordance with the present invention, by adding thereto a summing amplifier 101 in the amplitude command path to the sine wave generator 35. The amplitude command which previously was applied to the input A* in FIG. 2 is now connected to one input of a summing amplifier 101. The other input of summing amplifier 101 is connected to a resonance suppressing feedback circuit 102-103. Resonance suppressing feedback circuit 102-103 is connected to a suitable current sensor 104 in the a-c power line leading from a-c source 7 to rectifier 16.

The resonance suppressing feedback circuit 102-103 operates to measure the instantaneous power line current. The signal produced is rectified in rectifier component 102 and is then filtered in filter component 103. With appropriate filtering, the output signal to summing amplifier 101 forces the pulse width modulated current to respond to resonance current in such a manner as to suppress oscillations in the input circuit.

Rectifier component 102 rectifies the current signal measured at sensor 104 since the current being supplied to the inverter which has the resonant current superimposed has been rectified in rectifier 16. The amplitude command A* which is adjusted to damp the resonant current is a d-c command. The filter component 103 is a high pass filter to block the 60 and 120 hertz component of the power line and pass the resonant frequency caused by the a-c line inductance and the d-c link capacitor 24. The filter is represented by a Laplace transfer function $Ks/1+\tau s$ where s is the Laplace operator, K is a gain and $\tau$ is a time constant.

Figure 4B:
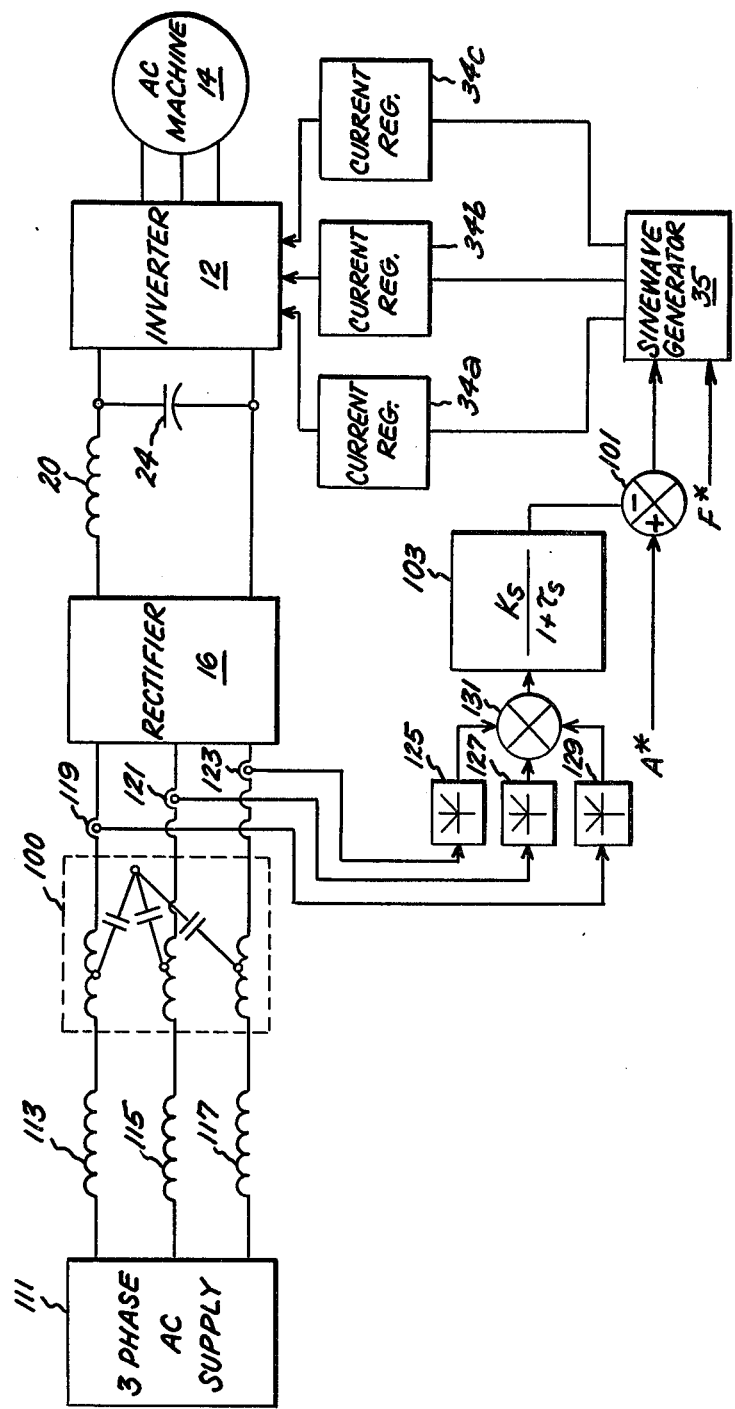
FIG. 4b is a schematic diagram of another embodiment of the present invention.

Referring to FIG. 4b the invention is applied to an inverter drive circuit supplied by a three phase a-c supply 111. The system inductances include a-c line inductances 113, 115 and 117, the wire inductance 20 and the inductance included in the electromagnetic interference filter 100, if such a filter is employed. Current sensor 119, 121 and 123 are connected in each of the three phases of the a-c power line leading from the three phase source 111 to the three phase rectifier 16, respectively. Each sensor 119, 121 and 123 is connected to a rectifier circuit 125, 127 and 129, respectively. The output signal of each of the rectifiers 125, 127 and 129 is summed in a summing amplifier 131. The output of the summer is connected to a filter 103. The output signal of filter 103 is summed with the amplitude command A* and connected to sine wave generator 35. The resonance suppressing circuit comprises the rectifiers 125, 127 and 129, summer 131 and filter 103. The filter 103 receives the absolute value of the sum of the line currents and passes the resonant current portion to modify the amplitude command A* in such a manner as to suppress oscillations in the input circuit.

Figure 5:
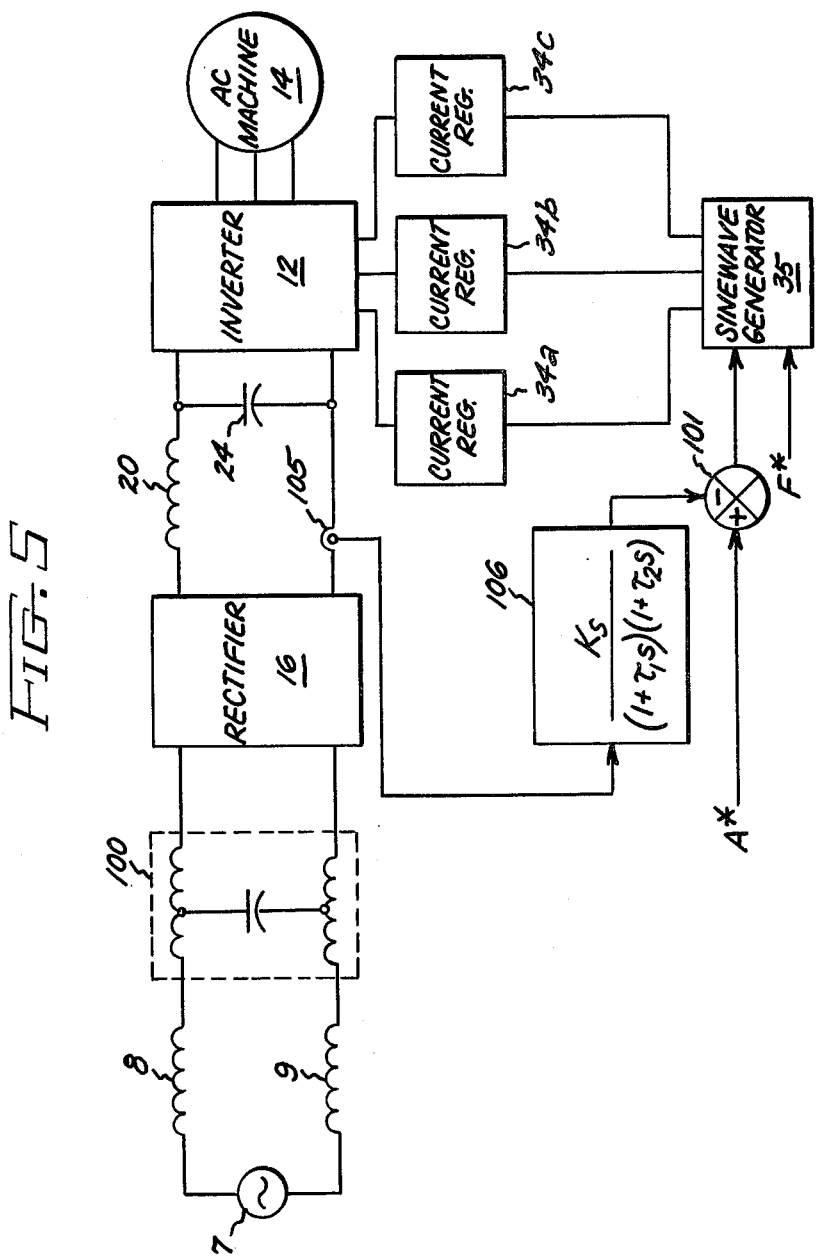
FIG. 5 is a schematic diagram of another embodiment of the control for a pulse width modulated inverter machine drive system such as that of FIG. 1 when modified with the novel additional control loop of the invention for suppression of line current resonance.

Referring to FIG. 5 a resonance suppressing feedback circuit 106 can be used in place of resonance suppressing feedback circuit 102-103. A d-c current sensor 105 is located between rectifier 16 and capacitor 24 to measure the current returning to the rectifier 16. Rectification of the d-c current signal is not necessary as in resonance suppressing feedback circuit 102-103. Since the d-c link current returning from the d-c filter capacitor and the inverter 12 is being measured in the embodiment of FIG. 5, this embodiment is suitable for use with single and multiphase a-c supplies as well as with a d-c supply replacing the a-c supply and rectifiers. With a d-c supply such as a battery, resonance current problems can occur due to wire inductances and the d-c filter capacitor.

Figure 6:
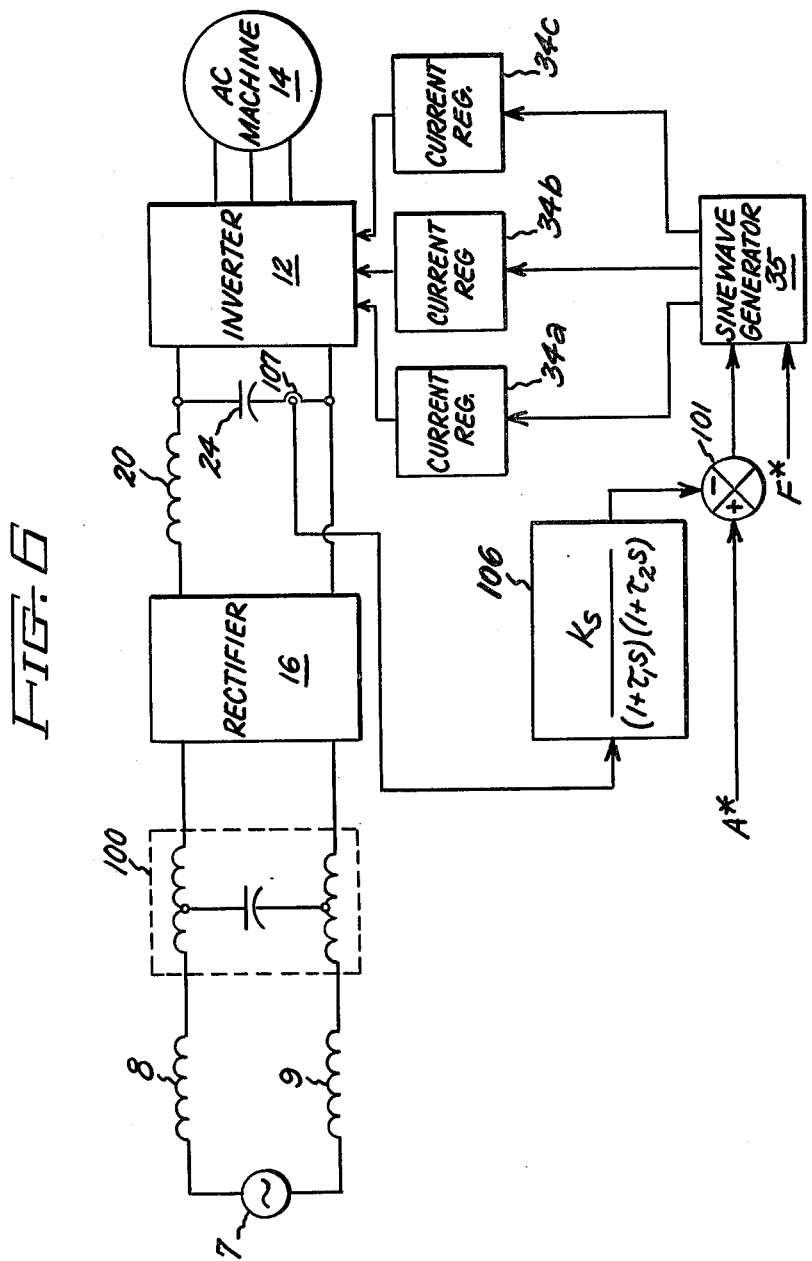
FIG. 6 is a schematic diagram of still another embodiment of the control of a pulse width modulated inverter machine drive system such as that of FIG. 1 when modified with the novel additional control loop of the invention for suppression of line element resonance.

Referring now to FIG. 6, a resonant suppressing feedback circuit 106 is shown. A d-c current sensor is located in series with filter capacitor 24. The band pass filter 106 which is connected to sensor 105 blocks the 60 and 120 hertz components of the power line, passing most of the resonance frequencies and blocks the chopping ripple from the inverter 12. The band pass filter has a Laplace transform of $Ks/(1+\tau_1 s)(1+\tau_2 s)$ where K is a gain constant, s is the Laplace operator and $\tau_1$ and $\tau_2$ are time constants. Capacitor current responsiveness would also enable reduction of resonance current due to the machine inductance and filter capacitor 24 which occurs during the period when reflected motor voltage is higher than the instantaneous line voltage. The filtering requirements for the capacitor current monitoring mode are more stringent than for a-c power line monitoring since the pulse width modulation chopping ripple must be filtered from the signal before resonance suppression can be accomplished. Reducing the motor current command during periods when the motor or machine voltage is higher than the line voltage offers improvement in motor current resonance while maintaining full use of line resonance suppression. As with the circuit of FIG. 5, control loop 106 of FIG. 6 can be used with single and multiphase supplies as well as a d-c source such as batteries, since d-c current is measured.

FIGS. 7a and 7b show the improvement which is obtained by the additional control loop of the present invention. Thus, in FIG. 7a there is shown the power line current and d-c capacitor voltage which are obtained when using the prior art control circuit of FIG. 2. It will be noted that there is substantial current ripple in the power line current caused by resonance principally between the d-c filter capacitor 24 and the line inductance. This substantial ripple can be minimized by increasing the size of the capacitor 24 and by adding a smoothing choke 20 to the system. By adding the control loop of the invention, however, as shown in FIGS. 4a, 4b, 5 and 6, the power line current has a much lower ripple, as shown in FIG. 7b, and similarly the d-c capacitor voltage is a smoother half wave. Significantly, this improvement is obtained with a minimum size filter capacitor 24.

FIGS. 8a and 8b show respective machine currents for each of the three phases of a three-phase machine for control by the circuit of FIGS. 2 and 4a, respectively. Note that the machine currents for each of the phases of machine 14 are unaffected by the additional control loop of FIG. 4a so that motor current is substantially unaffected even though line current resonance is suppressed while using a minimum size filter capacitor 24.

The foregoing describes a control circuit for suppressing line resonance currents in a current feedback pulse width modulation system while allowing minimum d-c filter operation and maintaining the instantaneous line current at the minimum required to support the instantaneous power flow.

Although the present invention has been described in connection with several preferred embodiments thereof, many variations and modifications will now become apparent to those skilled in the art. It is preferred, therefore, that the present invention be limited not by the specific disclosure herein, but only by the appended claims.

What is claimed is:

1. An alternating current machine drive system for a multiphase alternating current machine comprising:
    a d-c filter capacitor connected to a d-c power source;
    an inverter connected to said filter capacitor for providing a-c power to said machine;
    means for measuring resonance current due to said filter capacitance and power source inductance;
    control means for providing switching signals to said inverter comprising a waveform generator responsive to a frequency and an amplitude command, said amplitude command modified by said resonance current, and a current regulating means responsive to actual motor current and a reference waveform signal from said waveform generator for causing said inverter to provide the commanded amplitude and frequency currents to said machine while damping the resonance current due to said filter capacitance and power source inductances.

2. The drive system of claim 1 wherein said means for measuring resonance current comprises sensor means for measuring the current in said filter capacitance and filter means to remove the chopping ripple caused by said inverter switching.

3. The drive system of claim 1 wherein said means for measuring resonance current comprises sensor means for measuring the dc current provided by said d-c source to said filter capacitor and said inverter.

4. An alternating current machine drive system for a multi-phase alternating current machine comprising:
    first rectifier means connected to a single phase a-c power line source;
    a d-c filter capacitor connected across the output of said rectifier;
    an inverter connected to said filter capacitor for providing a-c power to said machine;
    means for measuring resonance current due to said filter capacitance and power source inductance;
    control means for providing switching signals to said inverter comprising a waveform generator responsive to a frequency and an amplitude command, said amplitude command modified by said resonance current, and the current regulating means responsive to actual motor current and a reference waveform signal from said waveform generator for causing said inverter to provide the commanded amplitude and frequency currents to said machine while damping the resonance current due to said filter capacitance and power source inductances.

5. The drive system of claim 4 wherein said means for measuring resonance current comprises:
    sensor means connected to measure current provided by said a-c source, to said first rectifier;
    second rectifier means connected to said sensor means and filter means connected to said second rectifier means for removing the a-c power line components.

6. The drive system of claim 4 wherein said means for measuring resonance current comprises:
    sensor means for measuring the current in said filter capacitor and filter means for removing the power line components and said inverter chopping ripple.

7. The drive system of claim 4 wherein said means for measuring resonance current comprises:
    sensor means for measuring the current provided by said first rectifier means; and
    filter means connected to said sensor means for removing the power line components and said inverter chopping ripple.

8. An alternating current machine drive system for a multi-phase alternating current machine comprising:
    first rectifier means connected to a multi-phase a-c power line source; and
    a d-c filter capacitor connected across the output of said first rectifier means;
    an inverter connected to said filter capacitor for providing a-c power to said machine;
    means for measuring resonance current due to said filter capacitance and power source conductance;
    control means for providing switching signals to said inverter comprising a waveform generator responsive to a frequency and an amplitude command, said amplitude command modified by said resonance current, and a current regulating means responsive to actual motor current and a reference waveform signal from said waveform generator for causing said inverter to provide the commanded amplitude and frequency currents to said machine while damping the resonance current due to said filter capacitance and power source inductances.

9. The drive system of claim 8 wherein said means for measuring resonance current comprises:

sensor means for measuring the a-c line current provided by each phase of the multiphase source, a plurality of second rectifier means for rectifying the signal from each of said sensors;

summing means for combining the output of said plurality of rectifiers, filter means connected to said summer means for removing the a-c components from said multiphase power line.

10. The drive system of claim 8 wherein said means for measuring resonance current comprises sensor means for measuring the current in said filter capacitor and filter means for removing the power line components and said inverter chopping ripple.

* * * * *